US012076946B2

(12) United States Patent
DeOliveira et al.

(10) Patent No.: US 12,076,946 B2
(45) Date of Patent: Sep. 3, 2024

(54) PREFORM, COMPOSITE STRUCTURE AND PANEL, AND METHODS OF FORMING SAME

(71) Applicant: Fast Build Systems Pty Ltd, Sydney (AU)

(72) Inventors: Paul George DeOliveira, Sydney (AU); Alan Stephen Jones, Sydney (AU)

(73) Assignee: FAST BUILD SYSTEMS PTY LTD, Bonnyrigg Heights (AU)

( * ) Notice: Subject to any disclaimer, the term of this patent is extended or adjusted under 35 U.S.C. 154(b) by 442 days.

(21) Appl. No.: 17/266,186

(22) PCT Filed: Aug. 1, 2019

(86) PCT No.: PCT/AU2019/050809
§ 371 (c)(1),
(2) Date: Feb. 5, 2021

(87) PCT Pub. No.: WO2020/028936
PCT Pub. Date: Feb. 13, 2020

(65) Prior Publication Data
US 2021/0299985 A1    Sep. 30, 2021

(30) Foreign Application Priority Data
Aug. 8, 2018    (AU) ................................ 2018902890

(51) Int. Cl.
*B29C 70/68* (2006.01)
*B29B 11/16* (2006.01)
(Continued)

(52) U.S. Cl.
CPC ............ *B29C 70/682* (2013.01); *B29B 11/16* (2013.01); *B29C 70/025* (2013.01);
(Continued)

(58) Field of Classification Search
CPC ..... B29B 11/16; B29C 70/025; B29C 70/446; B29C 70/48; B29C 70/682; B29D 99/0017; B29K 2063/00; B29L 2031/60
See application file for complete search history.

(56) References Cited

U.S. PATENT DOCUMENTS

2007/0293107 A1* 12/2007 Follo ..................... F41H 5/0478
89/36.02
2011/0146487 A1* 6/2011 Celik ................. B01D 53/0407
96/121
(Continued)

FOREIGN PATENT DOCUMENTS

WO    2005038160    4/2005
WO    2016198883    12/2016

OTHER PUBLICATIONS

International Search Report filed in PCY/AU2019/050809 mailed Nov. 8, 2019.

*Primary Examiner* — Hai Vo
(74) *Attorney, Agent, or Firm* — RANKIN, HILL & CLARK LLP (57) ABSTRACT

A preform for forming a composite structure, such as, but not limited to a panel for a building, house or the like includes a body substantially formed of a reinforcing material. The reinforcing material defines one or more compartments or sections. The compartments are fillable with a granular filler material through which settable liquid matrix material is impregnatable to form the composite structure. There is also disclosed a composite structure, a panel and related methods of forming the preform, the composite structure and the panel.

11 Claims, 6 Drawing Sheets

(51) Int. Cl.
    *B29C 70/02*   (2006.01)
    *B29C 70/44*   (2006.01)
    *B29K 63/00*   (2006.01)
    *B29L 31/60*   (2006.01)

(52) U.S. Cl.
    CPC ........ *B29C 70/446* (2013.01); *B29K 2063/00* (2013.01); *B29L 2031/60* (2013.01)

(56) References Cited

U.S. PATENT DOCUMENTS

| | | | |
|---|---|---|---|
| 2011/0266088 A1* | 11/2011 | Koike | B32B 7/12 |
| | | | 181/290 |
| 2012/0107611 A1* | 5/2012 | Yang | B01J 13/043 |
| | | | 264/43 |
| 2018/0147799 A1* | 5/2018 | Fergusson | B29C 70/68 |
| 2020/0122071 A1* | 4/2020 | Jasuja | B01D 39/1623 |

* cited by examiner

PREFORM, COMPOSITE STRUCTURE AND PANEL, AND METHODS OF FORMING SAME

RELATED CASES

This application claims priority from Australian provisional patent application no. 2018902890 filed on the 8 Aug. 2018, the contents of which are incorporated by reference.

TECHNICAL FIELD

The invention relates to a preform for forming a composite structure such as a panel, a composite structure, a panel and methods of forming the preform, the composite structure and the panel. The composite structure and/or panel may be suitable for use in the construction of a building, house or the like.

BACKGROUND

Composite structures may be formed using a process generally called liquid composite moulding in which a preform is impregnated with liquid state matrix material that is conditioned to set. The preform may be a dry preformed reinforcing material such as carbon fibre fabric and the liquid state matrix material may be a resin such as an epoxy resin.

One type of liquid composite moulding is resin transfer moulding in which the preform is placed in a mould and the resin is transferred into the preform under positive operating pressures. During setting the resin may become relatively hot and the distribution of the resin and heat within the setting preform may result in excess heat and potential problems relating to heat distortion.

As a structure becomes thicker more resin is required which exacerbates the potential problems relating to heat distortion, and in addition, the increase use of resin increases costs of manufacturing. Accordingly, liquid composite moulding, in particular, resin transfer moulding is typically used for relatively thin structures such as automotive and aerospace panels.

The invention disclosed herein seeks to overcome one or more of the above identified problems or at least provide a useful alternative.

SUMMARY

In accordance with a first broad aspect there is provided, a preform for forming a composite structure, the preform including a body substantially formed of a reinforcing material defining a plurality of compartments, the compartments being fillable with a granular filler material through which settable liquid matrix material is impregnatable to form the composite structure.

In an aspect, the compartments are arranged to extend at least one of lengthwise and width wise of the body.

In another aspect, the compartments extend lengthwise along the body.

In another aspect, the compartments have at least one of a square or rectangular cross section.

In another aspect, open ends of the compartments are sealed to contain the granular filler material.

In another aspect, the reinforcing material is a dry preformed reinforcing material.

In another aspect, the dry preformed reinforcing material is a fibre-based woven material having a three-dimensional structure to provide the compartments.

In another aspect, the granular filler material is infused with a binder material to at least partially rigidify the preform.

In another aspect, the settable liquid matrix material is a resin.

In another aspect, the granular filler material includes particles having different sizes.

In another aspect, the granular filler material includes particles having different densities.

In another aspect, the granular filler material includes graded particles having different sizes so as to define a predetermined void ratio.

In another aspect, the preform is flexible or ridged.

In another aspect, the body is substantially rectangular in shape.

In another aspect, the body is at least 8 mm in thickness, and preferably greater than about 20 mm in thickness.

In accordance with second broad aspect there is provided, a panel formed using a preform as defined in any one of the previous claims.

In accordance with third broad aspect there is provided, a method of forming a preform for a composite structure, the method including the steps of: filling a plurality of compartments defined by reinforcing material of a body of the preform with a granular filler material through which a settable liquid matrix material is impregnatable to form the composite structure.

In an aspect, the method further includes the step of closing the plurality of compartments containing the granular filler material therein.

In another aspect, the method further includes the step of applying a binder material to the granular filler material such that the preform is rigidified whilst maintaining voids between the granular filler through which the settable liquid matrix material is impregnatable.

In accordance with fourth broad aspect there is provided, a method of forming a composite structure using a preform, the method including the steps of: Forming a preform by filling a plurality of compartments defined by reinforcing material of a body of the preform with a granular filler material; Fitting the preform to a mould; Impregnating the preform with a liquid matrix material such that the liquid matrix material passes through voids of the granular filler material and the reinforcing material so as to cure there throughout.

In accordance with fifth broad aspect there is provided, a method of forming a panel for a building using a preform, the method including the steps of: Forming a preform in the shape of the panel by filling a plurality of compartments defined by reinforcing material of a body of the preform with a granular filler material; Fitting the preform to a mould; Impregnating the preform with a liquid matrix material such that the liquid matrix material passes through voids of the granular filler material and the reinforcing material so as to cure there throughout thereby providing the panel.

BRIEF DESCRIPTION OF THE FIGURES

The invention is described, by way of non-limiting example only, by reference to the accompanying figures, in which.

DETAILED DESCRIPTION

Referring to FIGS. 1 to 4, there is shown an example of a preform 10 for forming a composite structure 12 (shown in FIG. 17) such as, but not limited to a panel 14 for a building, house or the like. In this example, the preform 10 includes a body 16 substantially formed of a reinforcing material 18.

The reinforcing material 18 defines one or more, and preferably a plurality of, compartments or sections 20. The compartments 20 are fillable with a granular filler material 22 through which settable liquid matrix material 24 is impregnatable to form the composite structure 12.

In more detail, the reinforcing material 18 may be a dry preformed reinforcing material such as a three-dimensional woven fabric material such as, but not limited to, flax, hemp, fibreglass carbon fibre or a combination thereof. A woven fabric material including flax and/or hemp may be preferable. The density and weave patterns may be varied as required and blended materials may be used.

The granular filler material 22 may take various forms and may be provided as, but not, limited to foamed (or expanded) recycled glass. The size may be graded from about 1 mm to 8 mm in diameter to provide a predetermined void ratio. The void ratio providing the space through which the settable liquid matrix material 24 may flow, in use. The void ratio may be adjusted, however, the void ratio in some examples may be, but not limited to about 10% to 30%, and preferably about 15%.

In some examples, the granular filler material 22 may be contacted or otherwise exposed to a binder material 26 that may be, but not limited to, a liquid or solid preform binder adapted to bind the granular filler material 22 to at least partially rigidify the preform 10. However, in other examples, the binder material 26 may be omitted and the preform 10 may be initially flexible. Both examples are contemplated herein. It is noted that the binder material 26 maintains the voids between the granular filler material 22.

The body 16 may be formed to any suitable shape. However, in this example, the reinforcing material 18 is arranged or "preformed" such that the body 16 have a generally rectangular plan form shape having opposing ends 30, opposing sides 32, a front face 34 and a rear face 36. The reinforcing material 18 may be cut from a larger piece of material to the desired shape. The thickness or height of the body 16 may be in the order of 8 mm to 200 mm, and preferably larger than about 20 mm and some examples may be in the range of about 15 mm to 50 mm in thickness and others in the range of about 20 to 30 mm in thickness. The width and length may vary, but may each be in the range of 0.1 to 10 meters. It is noted that the volume of the body as defined by the thickness, width and height is defined by the granular filler material 22.

The compartments 20 are arranged to extend lengthwise of the body 16 between the opposing ends 30 and generally parallel to the opposing sides 32. In this example, the compartments 20 are provided as a plurality of rectangular elongate compartments 38 that are divided by walls 40 of the reinforcing material 18. However, as shown in FIGS. 5 to 8, the shape of the compartments 20 may take various forms, shapes, and patterns and may include a plurality of similar or unequal sized compartments. The compartments 20 may include a plurality of compartments in the width wise and height wise direction. Examples of the patterns may include 20×20 mm square, 20×60 mm rectangular single layer, or 10×30 mm rectangular double layer configuration to form 20 mm overall thickness.

The compartments 20 may have openings 42 at one or both of the opposing ends 30. The filler material 22 may be introduced into one or both of the opposing ends 30, and the opposing ends 30 may be closed such as by stitching, taping or bonding such as by a glue. In examples where the binder material 26 is used the ends 30 may not need to be closed.

Depending on the form of the reinforcing material 18, the reinforcing material 18 may have side edges or flaps 44 that may be secured to the opposing sides 32 of the body 16. The side edges or flaps 44 may be stitched, taped or bonded such as by a glue to the opposing sides 32 or to one another. In examples where the binder material 26 is used, the opposing sides 32 may be open or a lengthwise cut is made to remove excess material and exposing the filler 22 and the binder material 26.

The completed preform 10 may therefore be a flexible or substantially rigid product having panel like shape. The width, height and thickness of the preform 10 may be the same as or substantially similar to the final panel 14 that may be formed using the example preform 10 as is further detailed below. It is noted that the preform 10 may can be made from multiple bodies or sections 12 bonded by composite tapes or other bonding means such as being formed in sandwich or tile arrangements. Fire retardants may also be applied.

Figure 17:
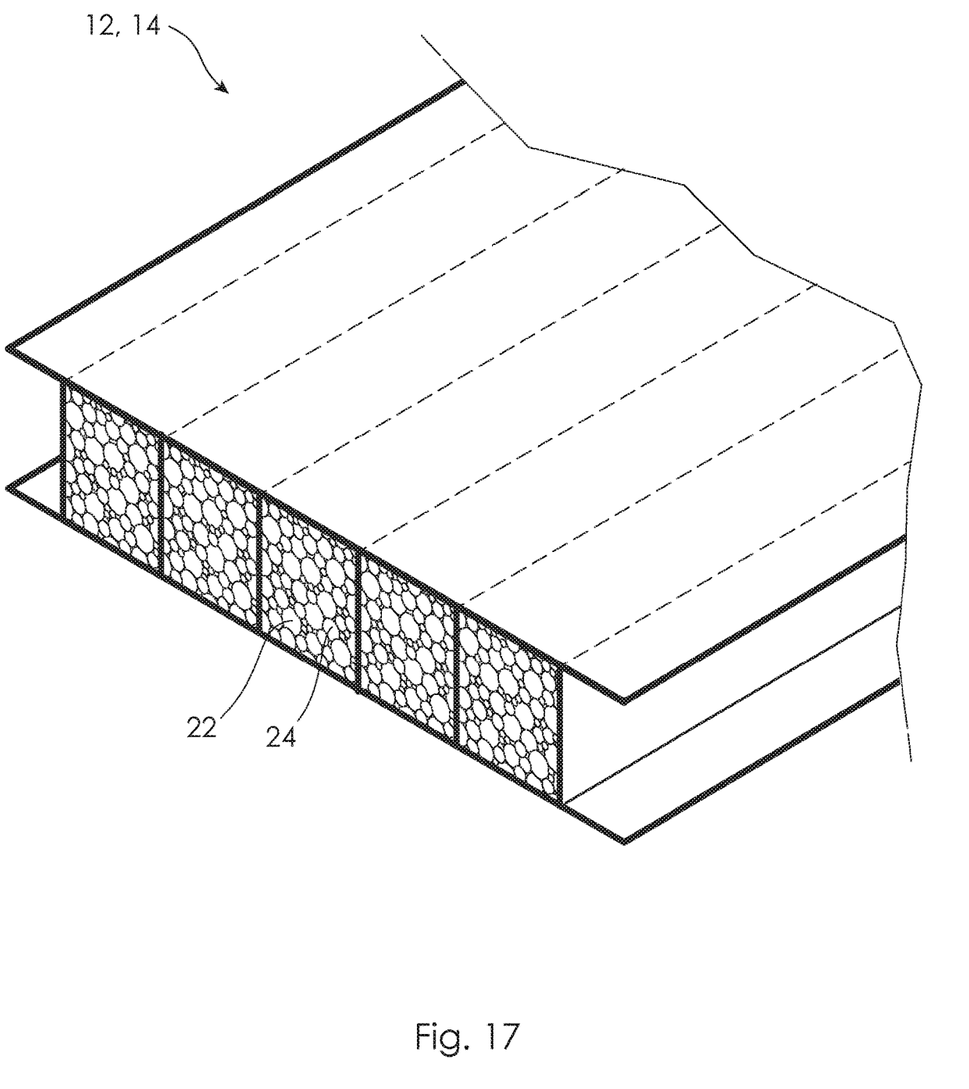
FIG. 17 is a perspective view illustrating an example of the composite structure in the form of a panel formed using the preform.

Turning now to forming of the composite structure 12, such as the panel 14, using the preform 10. The panel 14 may be formed by various liquid composite moulding techniques that include, in essence, impregnating the preform 10 with the liquid state matrix material 24 that flows through voids of the filler material 22 and reinforcing material 18 and sets or "cures" therein to rigidify the preform 10.

Figure 1:
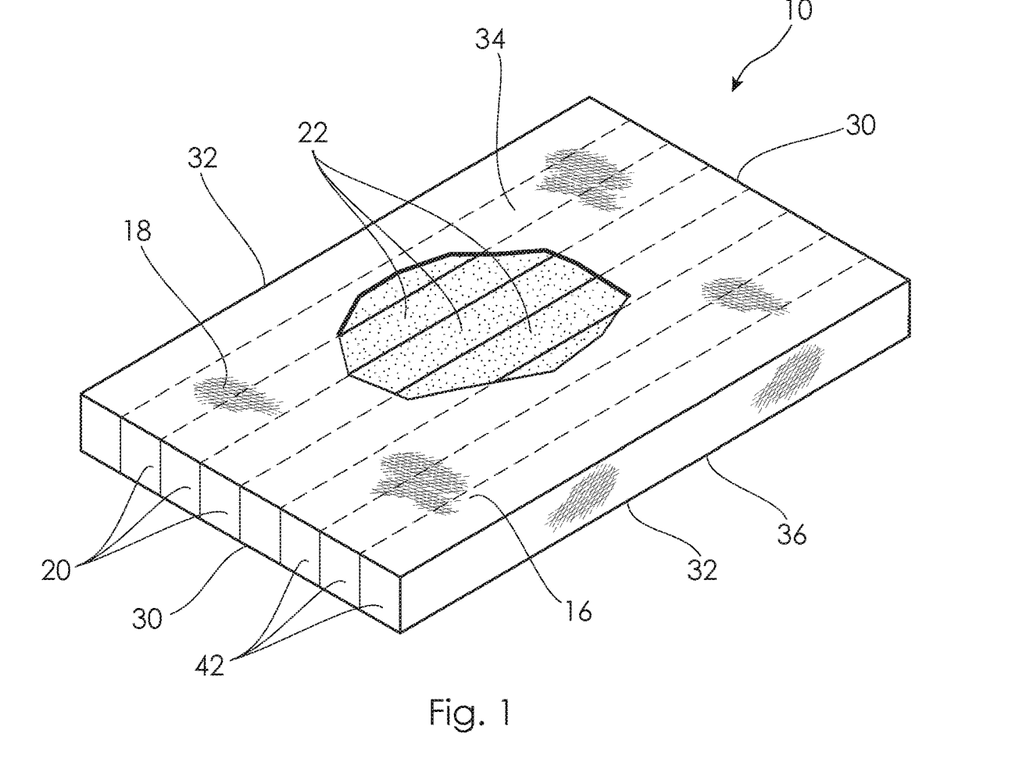
FIG. 1 is a perspective view of an example preform showing some of the outer material removed to reveal internal structure.
Figure 2:
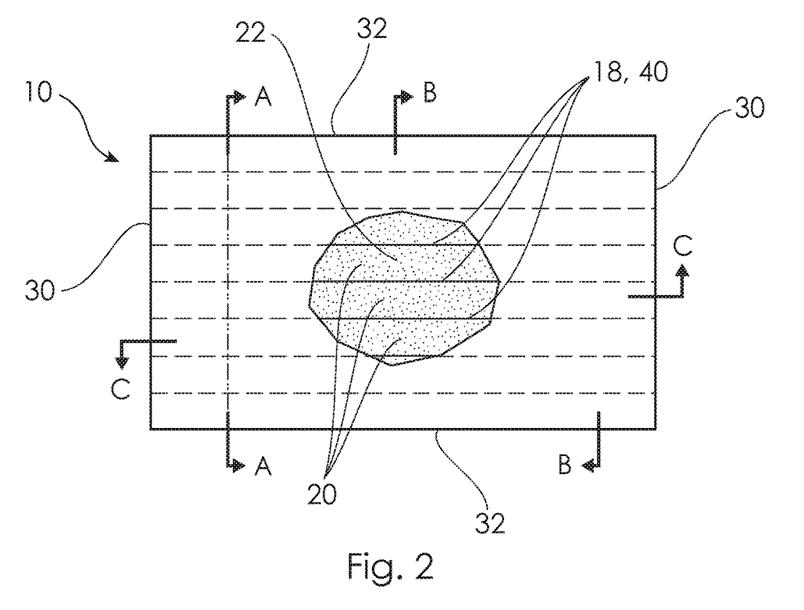
FIG. 2 is a top view of the preform showing some of the outer material removed to reveal an internal structure.
Figure 3:
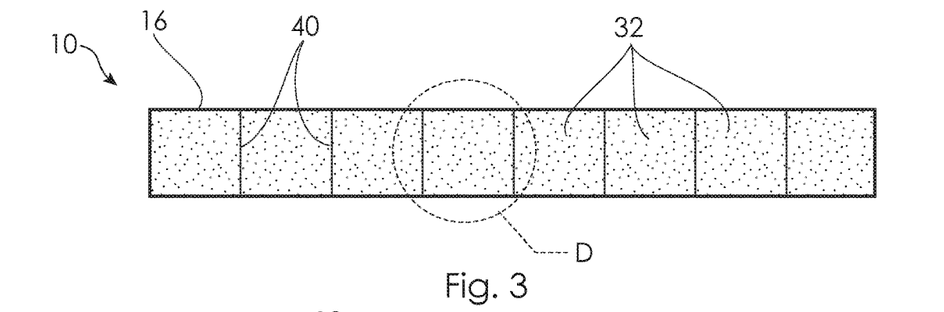
FIG. 3 is an end sectional view illustrating the preform along Section A-A.
Figure 4:
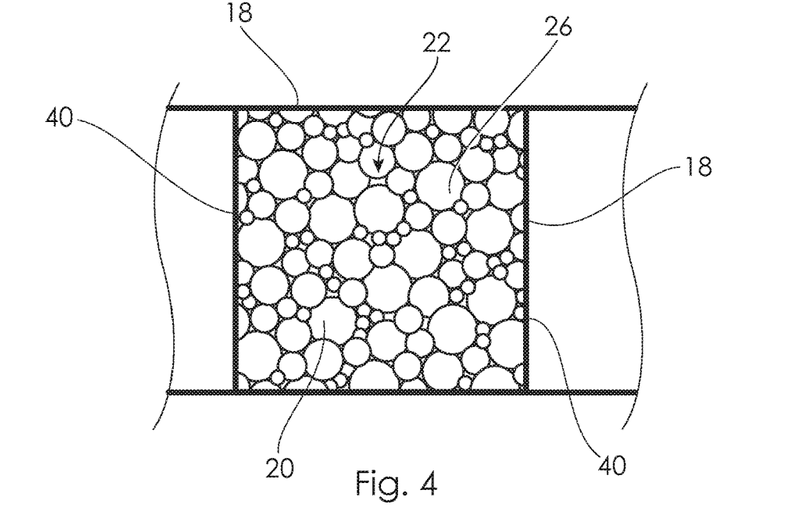
FIG. 4 is an end sectional view illustrating Detail D as shown in FIG. 3.
Figure 5:
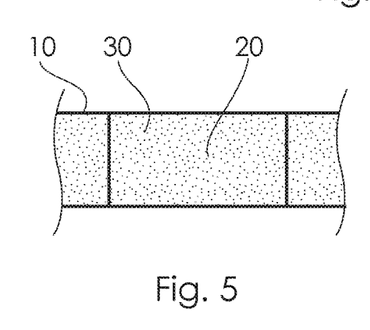
FIGS. 5 to 8 are end views illustrating various shapes and patterns of the reinforcement material of the preform.
Figure 6:
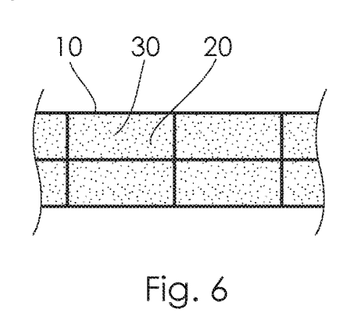
Figure 7:
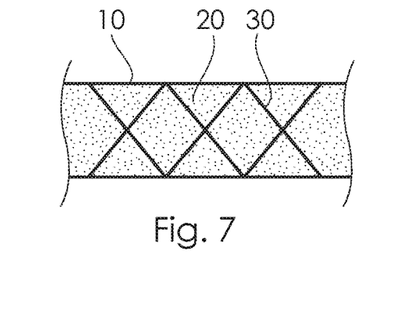
Figure 8:
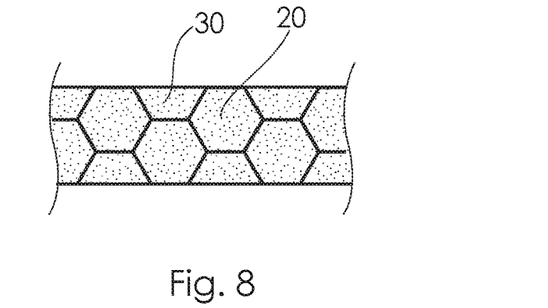
Figure 9:
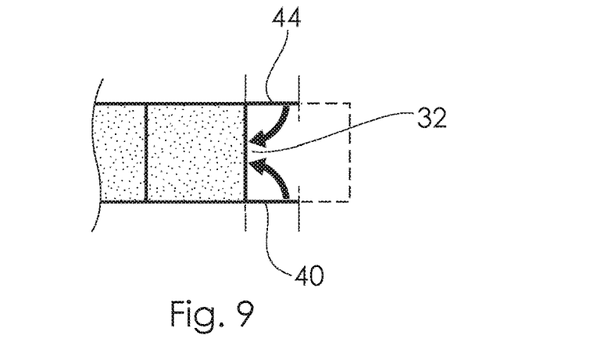
FIGS. 9 to 14 are end views illustrating side edge examples along sections B and C as shown in FIG. 2.
Figure 10:
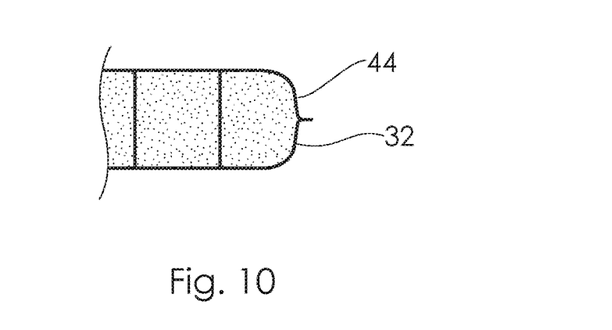
Figure 11:
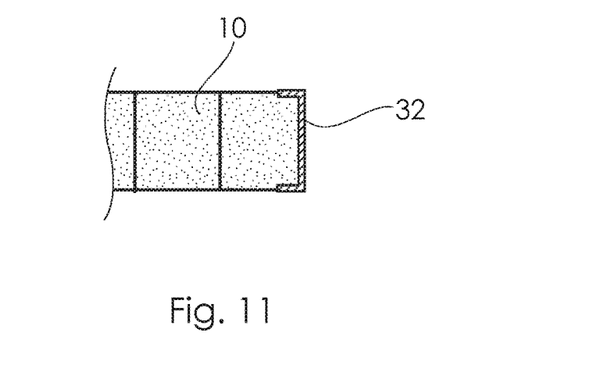
Figure 12:
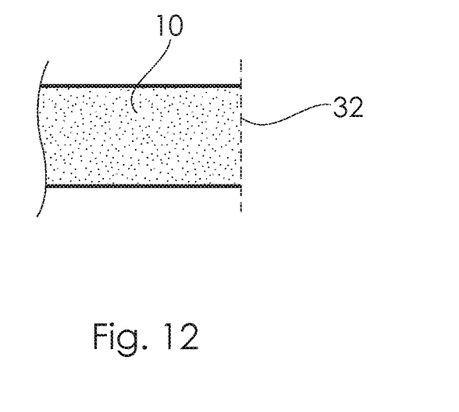
Figure 13:
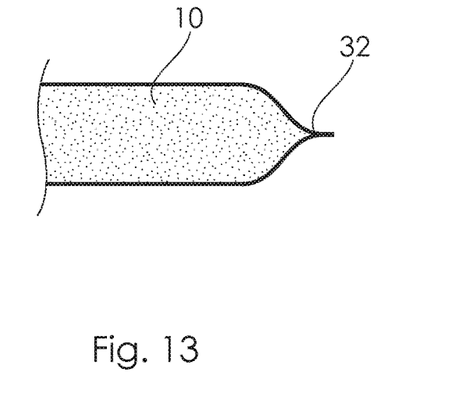
Figure 14:
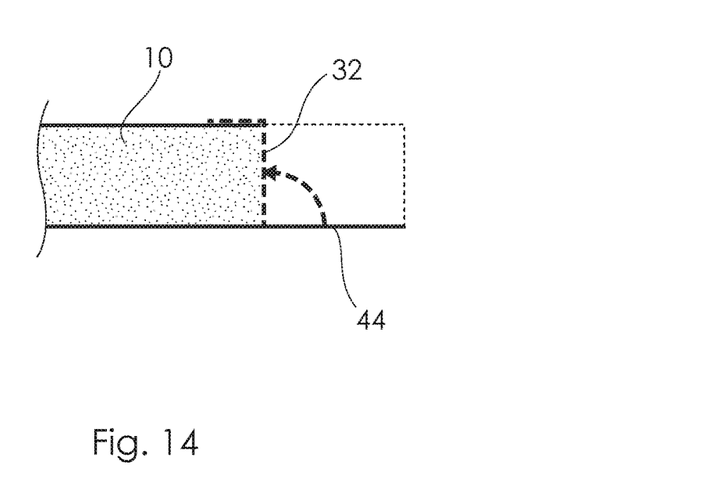
Figure 15:
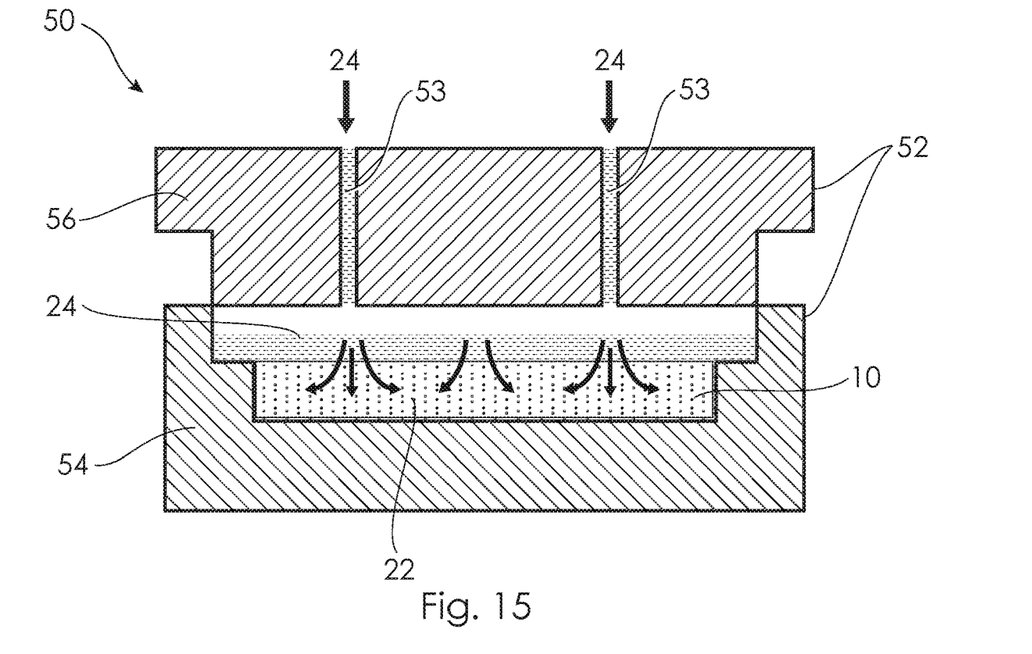
FIGS. 15 and 16 illustrate examples of a process for performing a resin transfer moulding process to form a composite structure using the preform.
Figure 16:
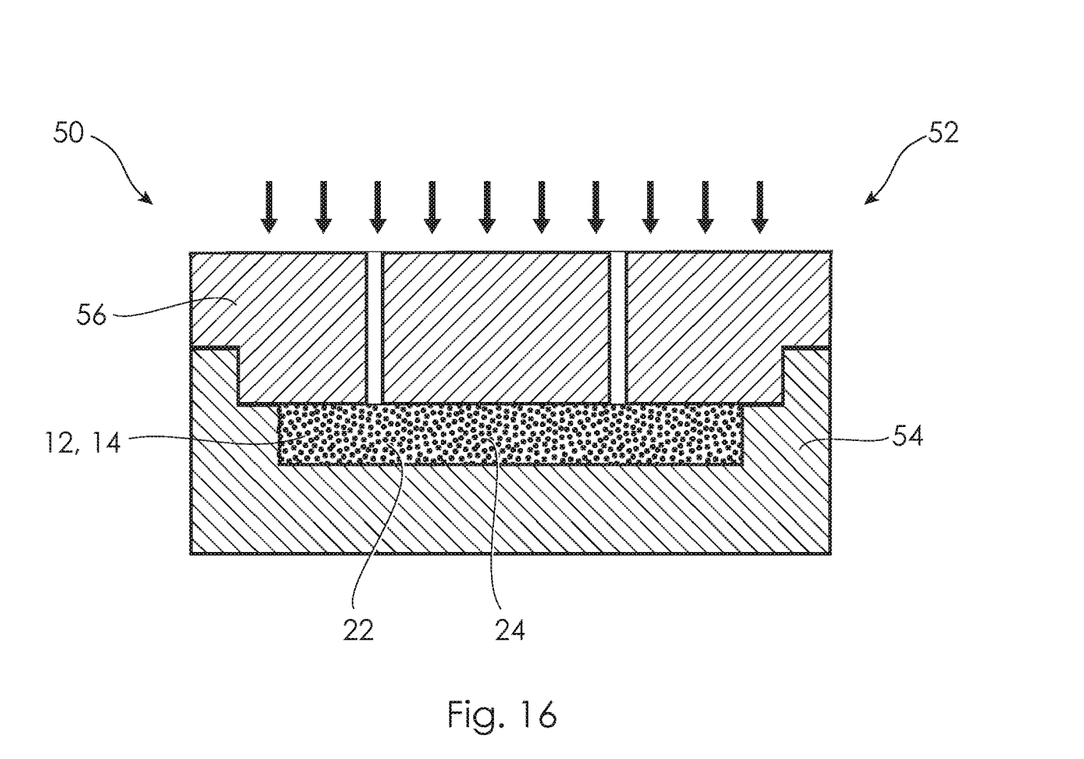

In more details, and referring to FIGS. 15 and 16, a resin transfer moulding (RTM) apparatus 50 is illustrated having a mould 52 and an injection port arrangement 53. The mould 52 may include a lower section 54 adapted to receive the preform 10 and liquid matrix material 24, and an upper section 56 adapted to apply a compressive force to the liquid matrix material 24 to urge the liquid matrix material 24 through the preform 10. Some examples may compress the both of the preform 10 and the liquid matrix material 24. However, in this example, it is preferred that the compressive force is applied only to the liquid matrix material 24 such that the initial thickness of the preform is maintained. In this context, the preform may also be referred to as an "insert".

Once the preform 10 is fitted to the lower section 54 of the mould 52, the liquid matrix material 24 may be introduced via the injection port arrangement 53 to fill the lower section 54 above the preform 10. The upper section 56 may then be lowered such as via a linkage or hydraulics (not shown) to compress the liquid matrix material 24 and urge this material through the preform 10.

The volume of the introduced liquid matrix material 24 may relate to the overall volume of the voids of the preform 10. The liquid matrix material 24 may then be allowed to cure prior to the upper section 56 being released and the preform 10 removed from the mould 52. The opposing ends and sides of the panel 14 may be trimmed, if required. The liquid matrix material 24 may be a resin such as epoxy resin. Examples include Water based epoxy, Bio-Epoxy or Green vinyl ester resin.

The formed composite structure 12, such as the panel 14, may find use in the building and construction industry such as, but not limited to, forming wall, floor, roof and ceiling panels in residential and commercial construction.

Advantageously, the granular filler material reduces and controls the void space to reduce the amount of liquid matrix material that is used. This assist to reduce the heat during curing that allows the relatively thick panels, in the order of 20 mm to 25 mm in thickness, to be made. A further advantage is a reduction in resin costs.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

The claims defining the invention are as follows:

1. A rigid composite structure formed using a preform in which the preform is impregnated with a settable liquid matrix material, the preform including a body substantially formed of an initially dry preformed reinforcing material defining a plurality of compartments arranged to extend at least one of lengthwise and width wise of the body, the compartments including a granular filler material having voids and being closed to contain the granular filler material, wherein the granular filler material includes graded particles having different sizes so as to define a predetermined void ratio of the voids in the range of about 10% to 30%, and wherein the initially dry preformed reinforcing material is adapted such that the settable liquid matrix material flows through the preform and into the closed compartments with the voids being filled with the settable liquid matrix material to form the rigid composite structure, wherein the different sizes of the graded particles are in the range of about 1 mm to 8 mm in diameter and the dry preformed reinforcing material is a fibre-based woven material having a three-dimensional structure to provide the compartments, wherein the settable liquid matrix material is a resin and the closed compartments are enclosed by the preformed reinforcing material, and wherein the rigid composite structure has the same width, length, and thickness as the preform.

2. The rigid composite structure according to claim 1, wherein the predetermined void ratio is about 15%.

3. The rigid composite structure according to claim 1, wherein the compartments extend lengthwise along the body.

4. The rigid composite structure according to claim 1, wherein the compartments have at least one of a square or rectangular cross section.

5. The rigid composite structure according to claim 1, wherein the granular filler material is infused with a binder material to at least partially rigidify the preform.

6. The rigid composite structure according to claim 1, wherein the granular filler material includes particles having different densities.

7. The rigid composite structure according to claim 1, wherein the preform is flexible or rigid.

8. The rigid composite structure according to claim 1, wherein the body is substantially rectangular in shape.

9. The rigid composite structure according to claim 1, wherein the body is at least 8 mm in thickness.

10. A panel formed using a rigid composite structure as defined in claim 1.

11. A method of forming a composite structure using a preform, the method comprising:
    forming a preform by filling a plurality of compartments defined by reinforcing material of a body of the preform with a granular filler material including graded particles having different sizes so as to define a predetermined void ratio in the range of about 10% to 30%, the compartments being arranged to extend at least one of lengthwise and width wise of the body, and closing the plurality of compartments to contain the granular filler material within the preform;
    fitting the preform to a mould; and
    impregnating the preform with a liquid matrix material such that the liquid matrix material passes into the preform and through voids of the granular filler material and the reinforcing material so as to cure there throughout, wherein the different sizes of the graded particles are in the range of about 1 mm to 8 mm in diameter and the dry preformed reinforcing material is a fibre-based woven material having a three-dimensional structure to provide the compartments, wherein the settable liquid matrix material is a resin and the closed compartments are enclosed by the preformed reinforcing material, and wherein the rigid composite structure has the same width, length, and thickness as the preform.

* * * * *